United States Patent [19]

Thomas

[11] 4,179,834
[45] Dec. 25, 1979

[54] FISHERMAN'S LEADER CADDY

[75] Inventor: Harold A. Thomas, 363 Poplar Fork Rd., Scott Depot, W. Va. 25560

[73] Assignees: Harold A. McClung; Harold A. Thomas, both of Scott Depot, W. Va.

[21] Appl. No.: 860,481

[22] Filed: Dec. 14, 1977

[51] Int. Cl.² ............................................. A01K 97/06
[52] U.S. Cl. .............................. 43/57.5 R; 43/57.5 A
[58] Field of Search .......... 43/57.5 R, 57.5 A, 54.5 A

[56] References Cited

U.S. PATENT DOCUMENTS

| 1,076,898 | 10/1913 | Madsen | 43/57.5 R |
| 2,130,112 | 9/1938 | Woolen | 43/57.5 R |
| 2,658,300 | 11/1953 | Snyder | 43/57.5 A |
| 2,659,997 | 11/1953 | Guestinger | 43/57.5 A |
| 2,836,005 | 5/1958 | Jerdee | 43/57.5 R |
| 2,927,395 | 3/1960 | Bartlett | 43/57.5 A |
| 3,180,053 | 4/1965 | Norton et al. | 43/57.5 R |

Primary Examiner—Robert Louis Spruill
Assistant Examiner—J. T. Zatarga
Attorney, Agent, or Firm—Oblon, Fisher, Spivak, McClelland & Maier

[57] ABSTRACT

A fisherman's leader caddy consisting of an elongated cylindrical plastic tube having a flange at either end. The flanges are provided with recesses for mounting fishing hooks. A plurality of equally spaced rows of carbon steel leader hooks are disposed around the perimeter of the leader caddy tube with some hooks pointed towards one end of the caddy tube, and the remaining caddy hooks pointing towards the other end of the caddy tube. During transportation and storage of multiple leader fishing tackle, the fishing hook is mounted within either flange, and the eye ends of the plural leaders are connected by resilient fasteners, such as rubber bands, to any of the caddy hooks, thereby maintaining the leaders taut and free of entanglement.

5 Claims, 6 Drawing Figures

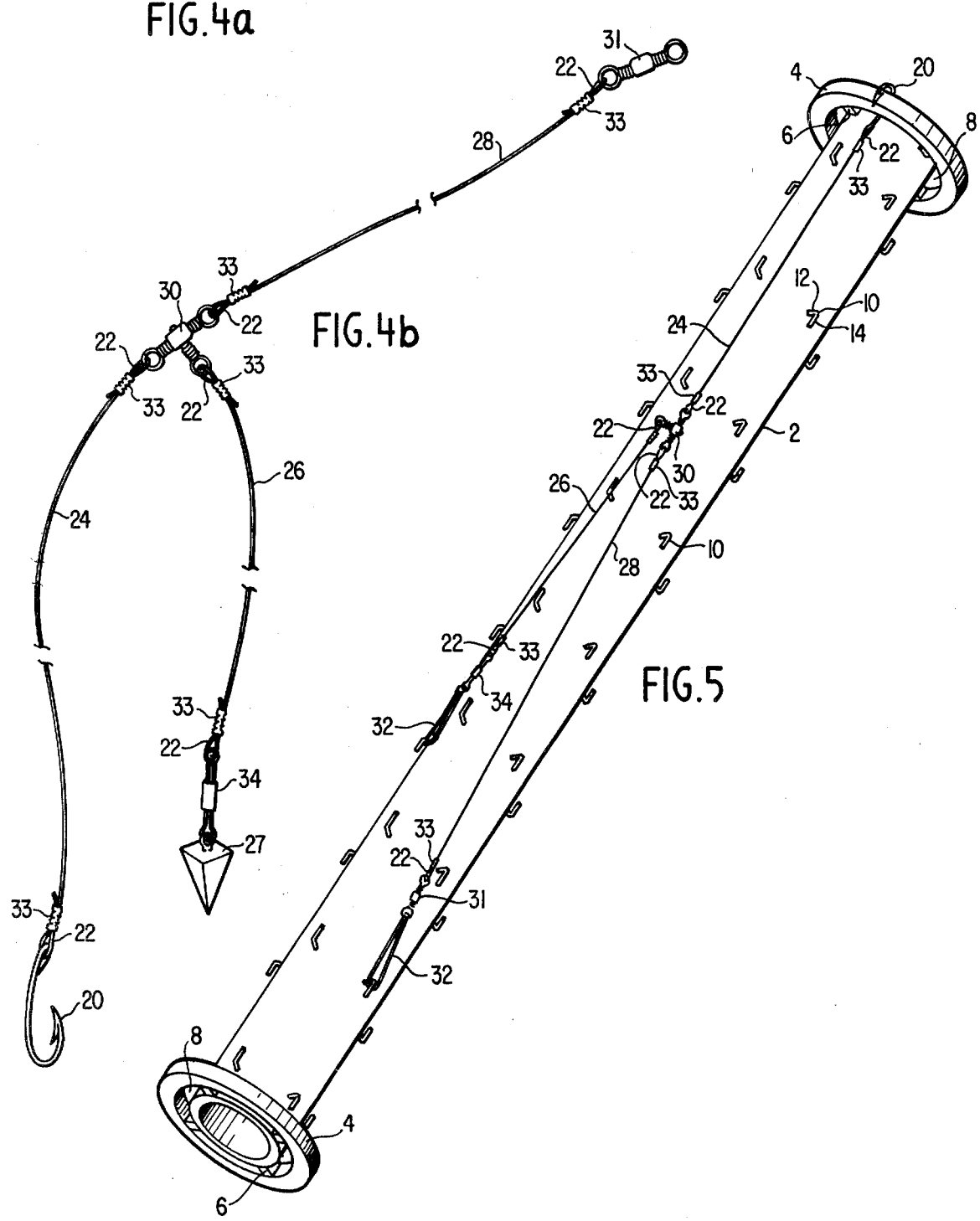

FISHERMAN'S LEADER CADDY

BACKGROUND OF THE INVENTION

1. Field of the Invention

This invention relates generally to fishing equipment and more particularly to an improved fisherman's leader caddy which is used for the transportation and storage of fishing leaders.

2. Description of the Prior Art

Of all angling components, fishing line wire (solid or stranded) or monofilament leaders have long been exceedingly troublesome to store and to transport. Due to the physical consistency of these leaders, they often become inextricably entangled into "bird nest" formations if not securely coiled or held immobile. As a result, considerable time and fishing opportunity has been lost in replacing broken leaders.

In the past, various devices have been designed to provide a means by which fishing gut or nylon leaders can be stored and transported. Typically these leader holders, as disclosed in U.S. Pat. Nos., 2,604,721; 2,658,300; 2,659,997; 2,667,010; 2,804,717; 3,490,168; 3,785,080; and 4,005,541 employ a central holder body having a flange at one end which engages the fish hook, and a plurality of hook-like devices at the other end which are designed to hold the eye end of the leader. Often either the "hook" end or the leader "eye" end of the leader holder is provided with springs by which the individual leaders can be loosely tensioned. Furthermore, several of these devices are provided with means to adjust the separation distance between the fishing hook engaging flange, and the leader engaging hooks.

While the leader holders discussed above have been generally satisfactory for snelled fishing hooks, which are generally used in fresh water fishing, they unfortunately have been inadequate to hold the multiple leader fishing tackle used primarily in salt water fishing. This salt water fishing tackle usually employs a plurality of individual leader elements of varying sizes connected in a star configuration. Because of the different leader lengths, the leader holders of the prior art have been unsuccessful in maintaining taut each of the plural leader elements. As a result, when a plurality of multiple leader elements were attached to these holders, the various slack leader elements have been prone to entanglement, which is precisely the situation which leader holders are required to prevent.

SUMMARY OF THE INVENTION

Accordingly one object of this invention is to provide a novel leader caddy to transport and store fishing leader tackle.

Another object of this invention is to provide a novel leader caddy suitable for use with multiple leader fishing tackle connected in a star configuration.

A further object of this invention is to provide an improved leader caddy to transport and to store multiple leader fishing tackle having leaders of different lengths.

Yet another object of this invention is to provide a novel leader caddy which avoids entanglement of the individual leader elements when multiple leader fishing tackle having leaders of different lengths is attached to the fishing caddy.

These and other objects of this invention are achieved by providing a fishing caddy consisting of an elongated cylindrical plastic tube having a flange at either end. The flanges are provided with recesses for mounting fishing hooks. A plurality of equally spaced rows of carbon steel leader hooks are disposed around the perimeter of the leader caddy tube with some hooks pointed towards one end of the caddy tube, and the remaining caddy hooks pointing towards the other end of the caddy tube. During transportation and storage of multiple leader fishing tackle, the fishing hook is mounted within either flange, and the eye ends of the plural leaders are connected by resilient fasteners, such as rubber bands, to any of the caddy hooks, thereby maintaining the leaders taut and free of entanglement.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 4a is a view of a single snelled hook leader,

FIG. 4b is a view of a typical three way stainless steel leader, with hook swivels and sinker appended with crimped steel sleeves, FIG. 5 is a perspective view of the leader caddy of FIG. 2 with a three way leader attached thereto.

DESCRIPTION OF THE PREFERRED EMBODIMENTS

Figure 1:
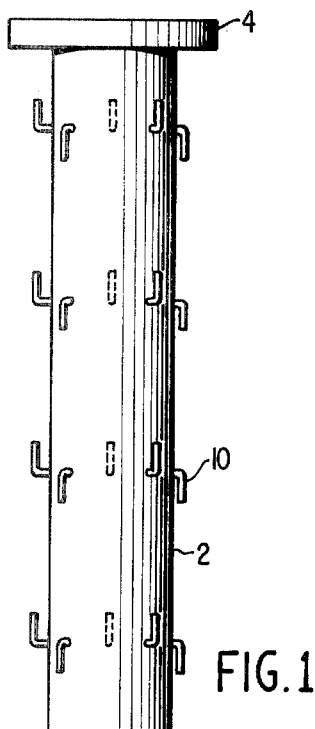
FIG. 1 is a side view of the leader caddy of this invention.

Referring now to the drawings, wherein like reference numerals designate identical or corresponding parts throughout the several views, and more particularly to FIG. 1 thereof, the leader caddy is seen to include an elongated cylindrical tube 2 which is provided with identical flanges 4 at either end of the tube 2. Each flange 4 is connected to the tube 2 by means of spacer arms 6, thereby forming recesses 8 in the spaces between the tube 2, flanges 4 and spacer arms 6, as shown in FIG. 2.

Figure 2:
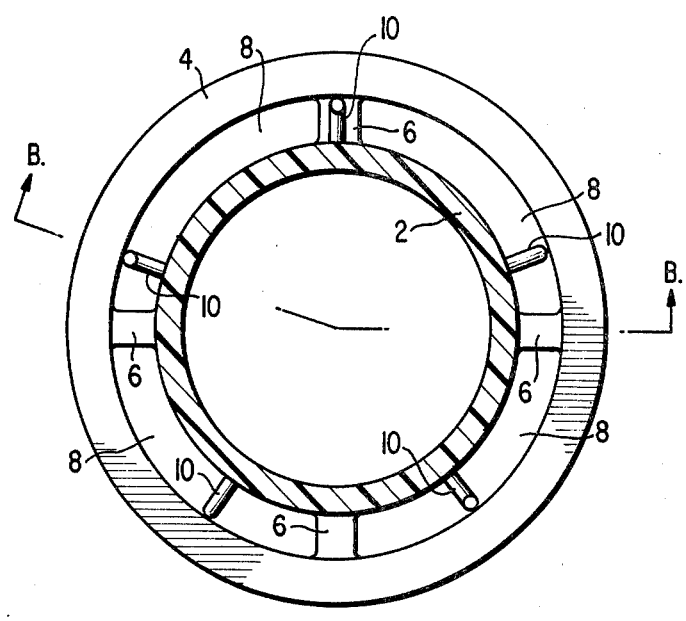
FIG. 2 is a sectional view along line A—A of the leader caddy of FIG. 1.

As seen in FIGS. 1 and 2, a plurality of caddy hooks 10 are disposed in rows symmetrically spaced around the cylindrical tube 2. Five rows of hooks 10 separated at angles of 72° have been found to be quite satisfactory. The individual hooks 10 of each row are symmetrically placed along the length of the elongated cylindrical tube 2, such that the hooks 10 from the plural rows are arranged at common intervals both along the length and around the periphery of the tube 2.

Figure 3:
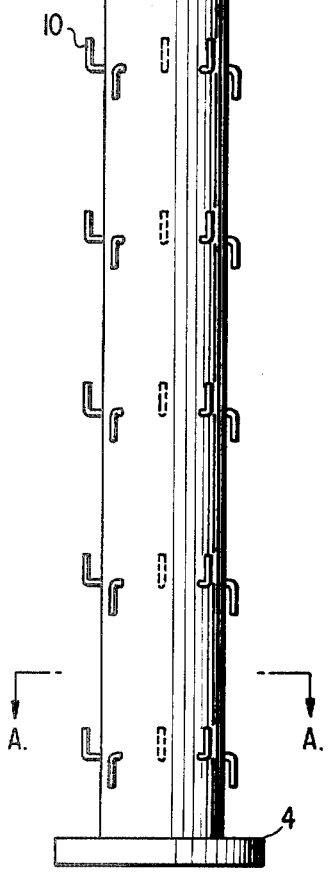
FIG. 3 is a sectional view along line B—B of the leader caddy of FIG. 2.
Figure 3:
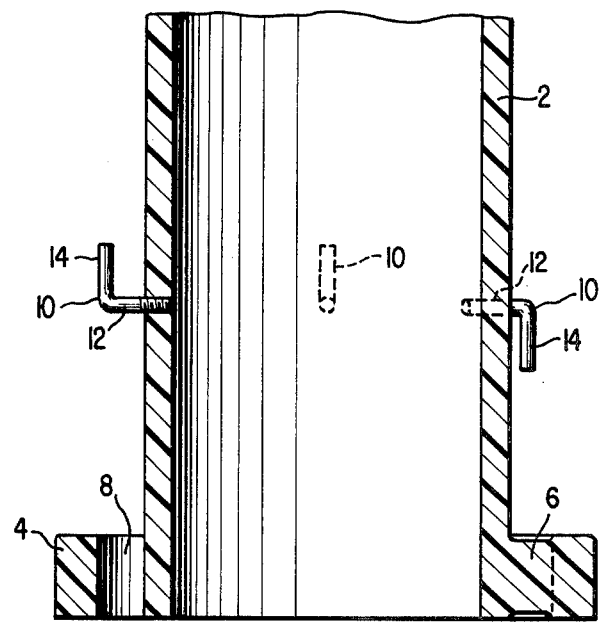

As illustrated in FIGS. 1 and 3 each caddy hook 10 consists of an arm 12 extending radially perpendicular to the axis of cylindrical tube 2, and a leg 14 appending from the arm 12 and extending parallel to the axis of the cylindrical tube 2. The legs 14 of three rows of hooks 10 are pointed in a direction towards one end flange 4, while the legs 14 of the remaining two rows of hooks 10 are pointed in the opposite direction towards the other end flange 4.

In view of the simple cylindrical design of the elongated tube, this tube can advantageously be manufactured of plastic using injection molding techniques. Thereafter, the caddy hooks 10 made of stainless steel or plastic can be inserted into the tube 2 using well known methods. For example, each caddy hook of s-steel can be provided with a self tapping thread arm 12 which can be screwed into a hole drilled into the elongated tube 2 while a plastic hook leg 14 could be cemented thereto.

FIGS 4a and 4b are provided to distinguish clearly the differences between the single snelled hooks and the three way leader combination with which the present invention finds primary utility. The single snelled hook, 10 generally indicated as 16, employs a leader snell 18, commonly made of a nylon strand 6-8 inches in length. At one end of the snell 18 is attached a fishing hook 20, while the other end is looped to form a looped leader eye 22. On the other hand, the three way leader shown in FIG. 4b is seen to include three individual leader elements, including a stainless steel leader 24 with a hook 20, a stainless steel sinker shank 26 with a sinker 27, and a stainless steel line leader element 28 connected to a line swivel 31. The three leader elements are centrally connected to the three way swivel 30 by means of stainless steel sleeves 33 crimped around looped leader eyes 22 formed at the end of the leader elements 24, 26 and 28. Also, a slip sinker connector 34 is normally used to interface the sinker 27 to the sinker shank 26. Crimped stainless steel sleeves 33 are likewise normally used to connect leader element 24, 26 and 28 to the hook 20, the slip sinker connector 34 and the line swivel 31 respectively. The three individual leader elements are usually of differing lengths which normally range from 10-15 inches.

The present invention, unlike the leader holders of the prior art, has been flexibly designed to accomodate the relatively complicated structure of the three way leader shown in FIG. 4b, and in particular the disparate lengths of the plural leader elements. Therefore, the elongated tube 2 is designed with a length of approximately 30 inches and a diameter of 2⅜ inches. Caddy hooks 10 are spaced 1½ inches from the flanges 4, and every 3¼ inches along the length of the tube 2. Furthermore, the caddy hooks 10 are presently designed as having ½ inch arms 12 and legs 14.

As shown in the perspective view of FIG. 5, the fishing hook 20 of the leader section 24 is mounted on either of the end flanges 4 through a flange recess 8. Thereafter the slip sinker connector 34 and the line leader element 28 are each connected to a resilient fastener 32, such as a rubber band; the fastener 32 is stretched to maintain the leader elements 26 and 28 taut; and the fastener 32 is then attached to a nearby caddy hook 10 having a hook leg 14 pointed in a direction away from the particular leader element being secured. In this way, the present leader caddy invention ensures that each leader element of a multiple leader fishing tackle is maintained taut, thereby keeping these elements free of entanglement.

As is seen from the above discussion, the leader caddy of the present invention provides the angler with a very flexible piece of equipment. Any number of multiple leader tackle combinations cn be attached to this leader caddy and removed therefrom free of entanglement and ready for use on a moments notice. In view of the identical flanges 4 provided at either end of the elongated tube 2, and the spatial orientation of the caddy hooks 10 relative to the flanges 4, a plurality of multiple leader elements of different lengths can easily be accommodated. Furthermore, the hollow tubular construction of the elongated cylindrical tube 2 promotes convenient transportation of the leader caddy by slipping the tube over a compatibly dimensional rod such as might be attached to a dune vehicle, and such as are often used for the transportation of surf rods.

Obviously, numerous modifications and variations of the present invention are possible in light of the above teachings. As an example, the caddy hooks 10 can be arranged other than as shown in the figures, provided they are dispersed along the entire length of the elongated tube 2. Likewise resilient fasteners other than rubber bands, such as springs, can be employed. Furthermore, protective caps can be attached at either end to provide a protective covering over any fishing hooks which are retained in the recesses 8 of flanges 4. It is therefore to be understood that within the scope of the appended claims, the invention may be practiced otherwise than as specifically described herein.

What is claimed as new and desired to be secured by Letters Patent of the United States is:

1. A fishing leader caddy for storing and transporting fishing leaders having multiple leader elements wherein at least one leader element includes a fishing hook and said multiple leader elements are connected to each other, said fishing caddy comprising:
   an elongated cylindrical hollow tube having two ends,
   flange means for attaching fishing hooks to said caddy, said flange means comprising a pair of annular flange members connected to respective ends of said tube, and plural radial connecting members connecting respective of said annular flange members to the respective tube ends, said flange members spaced apart from the respective tube ends by said radial connecting members such that said fishing hook can be hooked on said annular flange members,
   a plurality of caddy hooks imbedded in said elongated tube, said caddy hooks disposed at predetermined intervals along the length and around the periphery of said hollow elongated tube, and
   resilient fastening means for attaching said multiple leader elements to said caddy hooks, and for maintaining said leader elements taut.

2. A fishing leader caddy according to claim 1, wherein said elongated hollow tube comprises:
   a plastic material.

3. A fishing leader caddy according to claim 1, wherein:
   each of said caddy hooks comprises a radial arm extending perpendicular to the central axis of said cylindrical hollow tube, said radial arm embedded in said tube, and a leg section attached perpendicular to said radial arm and parallel to said central axis of said tube; and,
   some of said leg sections point towards one end of said tube, and the others of said leg sections point towards the other end of said tube.

4. A fishing leader caddy according to claim 1, wherein said caddy hooks comprise:
   a carbon steel material.

5. A fishing leader caddy according to claim 1, wherein said resilient fastening means comprises:
   durable pure gum rubber bands.

* * * * *